United States Patent [19]
McLellan

[11] Patent Number: 5,754,581
[45] Date of Patent: May 19, 1998

[54] DIFFERENTIAL IMPEDANCE DISCHARGE FOR PLASMA GENERATION

[76] Inventor: Edward J. McLellan, 422 Connie Ave., Los Alamos, N. Mex. 87544

[21] Appl. No.: 751,877

[22] Filed: Nov. 18, 1996

[51] Int. Cl.⁶ .................................................. H01S 3/097
[52] U.S. Cl. ........................... 372/87; 372/86; 372/58; 372/38
[58] Field of Search .................... 372/55, 58, 61, 372/65, 92, 93, 97, 98, 108, 87, 86, 88, 38

[56] References Cited

U.S. PATENT DOCUMENTS

| | | | |
|---|---|---|---|
| 4,088,965 | 5/1978 | Lauderslager et al. | 372/87 X |
| 4,380,079 | 4/1983 | Cohn et al. | 372/87 |
| 4,412,333 | 10/1983 | McLellan | 372/87 |
| 4,606,034 | 8/1986 | Eden et al. | 372/57 |
| 4,644,549 | 2/1987 | Oishi | 372/38 |
| 4,748,635 | 5/1988 | McLellan | 372/87 |
| 4,841,538 | 6/1989 | Yanabu et al. | 372/58 |
| 4,949,354 | 8/1990 | Maitland | 372/61 |
| 5,070,513 | 12/1991 | Letardi | 372/83 |
| 5,097,475 | 3/1992 | Perzl et al. | 372/87 |

*Primary Examiner*—Brian Healy
*Attorney, Agent, or Firm*—Samuel M. Freund

[57] ABSTRACT

A method and apparatus for generating uniform, transverse-electrical discharges in gaseous media between two principal discharge electrodes is described. At least one of the electrodes is segmented and a differential voltage is generated between the segments. Voltage from a single high-voltage source is applied between the principal discharge electrodes and between the segments of the segmented electrode through a single switch. A differential voltage suitable for producing a discharge between the segments is generated therebetween from the high-voltage source by using a differential impedance circuit. Once sufficient ionization is generated, a discharge between the principal electrodes occurs. The invention has been demonstrated to be useful for providing electrical excitation for a carbon dioxide laser oscillator which may be operated in either a flowing gas or sealed mode.

8 Claims, 2 Drawing Sheets

CROSS SECTION A–A

CROSS SECTION A–A

DIFFERENTIAL IMPEDANCE DISCHARGE FOR PLASMA GENERATION

FIELD OF THE INVENTION

The present invention relates generally to electrical generation and excitation of plasmas in gases and, more particularly, to the electrical generation and excitation of uniform plasmas in gases using a single switch to control the high voltage discharge.

BACKGROUND OF THE INVENTION

Creating a uniform glow discharge in a volume which is large compared to the electrode structure requires uniform preionization of the gaseous medium between the electrodes. This preionization can be generated by a variety of techniques including ultraviolet (UV) preionization from a spark source, electron beam ionization, x-ray ionization, or a corona discharge. These techniques all require that additional structures exist beyond the principal discharge electrodes and outside of the enclosure of the gaseous medium. Separate electronics power sources may also be required in addition to the power source necessary to generate and control the plasma between the two principal discharge electrodes.

In U.S. Pat. No. 4,412,333 for "Three-Electrode Low Pressure Discharge Apparatus And Method For Uniform Ionization Of Gaseous Media," which issued to Edward J. McLellan on Oct. 25, 1983, and in U.S. Pat. No. 4,748,635 for "Apparatus And Method For Uniform Ionization Of High Pressure Gaseous Media," which issued to Edward J. McLellan on May 31, 1988, a power employed to generate an ionizing voltage between a third electrode and one of the two principal discharge electrodes. In the latter ('635) patent, the ionizing voltage is also coupled to one of the principal electrodes in order to accelerate the plasma generation between the main discharge electrodes. Neither circuit requires a switch for the main discharge current. However, each requires a switch to accomplish the preionization discharge.

Accordingly, it is an object of the present invention to provide an electrical discharge apparatus for generating a uniform plasma in a gas which does not require separate preionization structures.

Another object of the present invention is to provide an electrical discharge apparatus for generating a uniform plasma in a gas which does not require separate preionization circuitry, and which has a switch for controlling the electric current in the main discharge in order to prevent damage to the electrodes from arcing therebetween.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus here of for uniformly ionizing a gaseous medium and for uniformly depositing energy therein, includes: a first, substantially planar electrode; a second, substantially planar electrode, spaced apart from, parallel to, and approximately coextensive with the first electrode, whereby a volume is formed therebetween into which the gaseous medium may freely circulate, the second electrode being segmented such that first electrically conducting segments are in electrical connection with one another, each pair of first segments being separated by and electrically insulated from electrically conducting second segments, the second segments being in electrical connection with one another; a first impedance network in electrical connection between the first segments of the second electrode and the first electrode, and having a first impedance for high-voltage pulses; a second impedance network in electrical connection between said second segments of the second electrode and the first electrode, and having a second impedance for high-voltage pulses, the second impedance network having a different impedance from the first impedance network, such that a differential voltage is created between the first segments and the second segments when a voltage pulse is applied thereto; and means for applying a voltage pulse to the first impedance network and to the second impedance network having sufficient amplitude and duration such that the voltage differential generates substantial ionization of the gaseous medium between the first segments and the second segments and such that the substantial ionization thus produced initiates a uniform electrical discharge through the gaseous medium between the first electrode and the second electrode.

In another aspect of the present invention and in accordance with its objects and purposes, the method hereof for uniformly ionizing a gaseous medium and for uniformly depositing energy therein, includes the steps of: introducing the gaseous medium into a volume formed by a first, substantially planar electrode and a second, substantially planar electrode spaced apart from, parallel to, and approximately coextensive with the first electrode, the second electrode being segmented such that first electrically conducting segments are in electrical connection with one another, each pair of first segments being separated by and electrically insulated from electrically conducting second segments, the second segments being in electrical connection with one another, and the first segments and second segments having different impedances for high-voltage pulses; and applying a high-voltage pulse between the first conducting segments of the second electrode and the first electrode, and between the second conducting segments of the second electrode and the first electrode having sufficient amplitude and duration whereby a voltage differential between the first conducting segments and the second conducting segments is established such that substantial ionization of the gaseous medium between the first segments and the second segments is generated and such that the substantial ionization thereby produced initiates a uniform electrical discharge through the gaseous medium between the first electrode and the second electrode.

Benefits and advantages of the present invention include the elimination of separate preionization circuitry and structure for achieving uniform electric energy deposition into the gaseous medium, and the inclusion of a high-voltage switch in the discharge circuit which controls the current between the principal discharge electrodes in the event that an arc takes place therebetween, thereby preventing damage to the electrodes.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Briefly, the present invention includes an apparatus and method for generating and exciting a uniform plasma between two principal electrodes, at least one of which is segmented. The electrodes are located within an enclosure into which a desired plasma gaseous medium is introduced. The impedance to these electrodes from the principal discharge power source is chosen so that a transient voltage differential is produced between alternate segments of the segmented principal electrode, thereby creating a uniform, low-energy preionization discharge between the segments at a lower voltage than is required to create a discharge between the principal electrodes without such preionization. The result is that a lower voltage is required to generate a significant current flow between the principal discharge electrodes than would otherwise be required without preionization. Moreover, this discharge is uniform as a result of uniform preionization. A transient differential voltage between the segments of the segmented electrode can be generated by a variety of methods. According to the teachings of the present invention, a single switch is inserted between the principal discharge and the voltage source which supplies voltage to the segments of the segmented electrode and the second main electrode in order to control both the preionization and the main discharge. The switch may be part of an over-current protection circuit which limits the discharge current in the event of an arc breakdown, thereby preventing electrode damage. The present apparatus allows a uniform plasma to be generated from a simple apparatus in terms of the number of components and their high voltage requirements, since a minimum DC voltage between the principal electrodes is required.

Figure 1B:
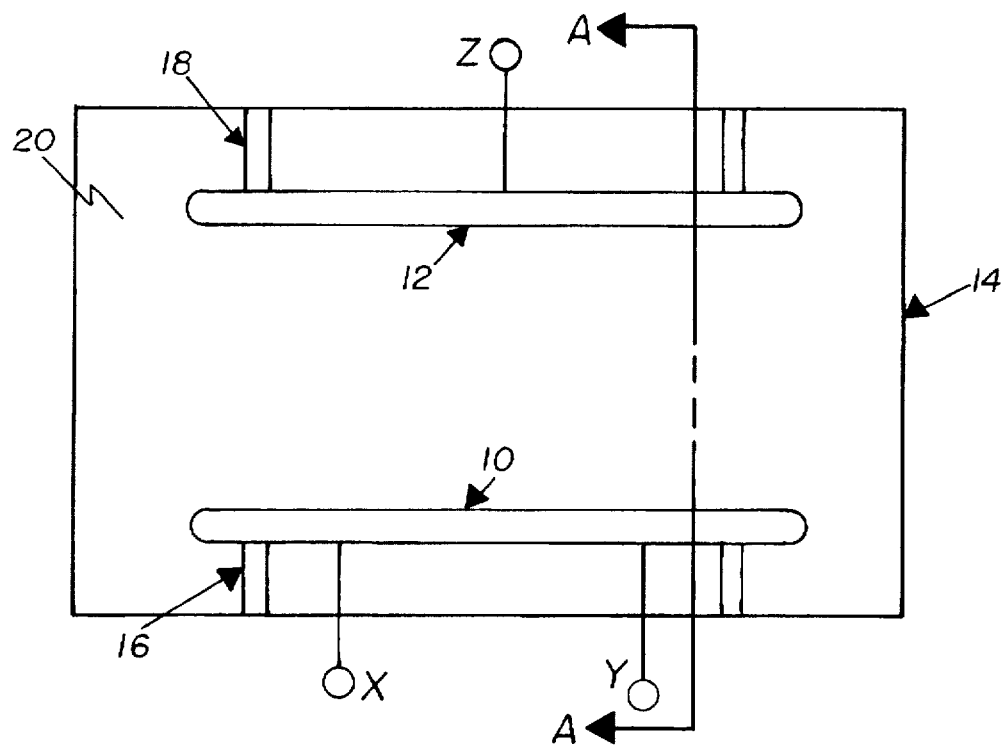
FIGS. 1a and 1b are schematic representations of an end planar view and a side planar view, respectively, of the apparatus of the present invention.
Figure 1A:
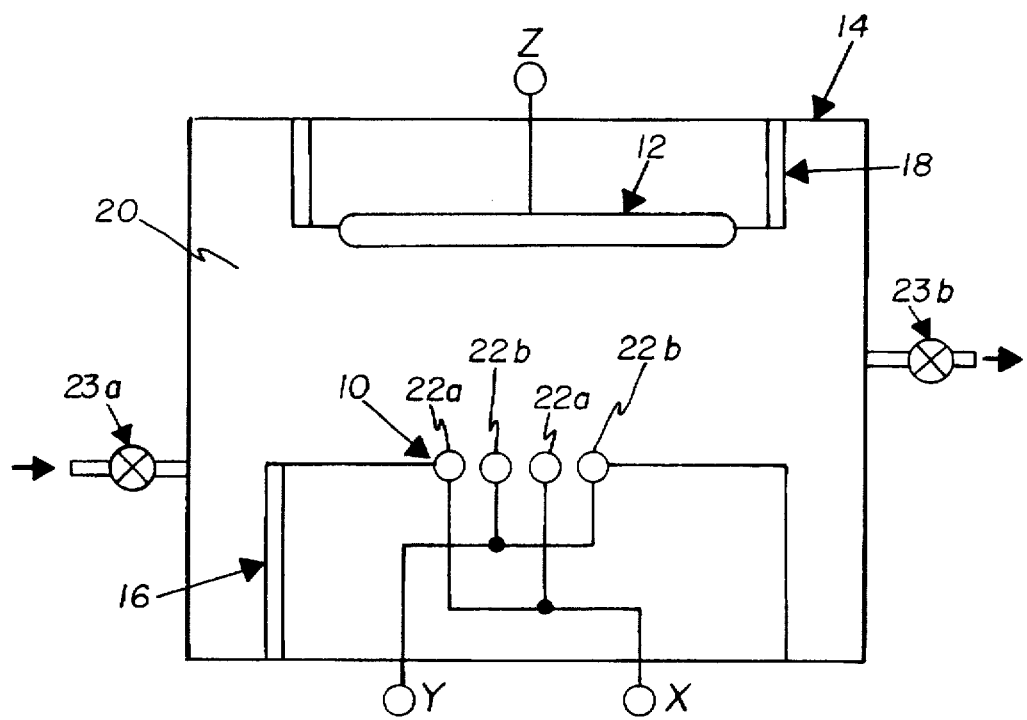

Reference will now be made in detail to the present preferred embodiment of the invention, an example of which is illustrated in the accompanying drawings. Similar or identical structure is identified using identical callouts. Turning now to FIGS. 1a and 1b, an end view and a side view, respectively, of a schematic representation of the apparatus of the present invention are shown. Principal, substantially planar, parallel discharge electrodes, 10 and 12 are suspended within gas enclosure, 14, by electrically insulating mounts, 16 and 18, respectively. The main discharge for generating and exciting the plasma in gaseous medium, 20, also within enclosure 14, occurs between these electrodes. Electrode 10 is segmented and is fabricated from alternating, parallel rods, 22a and 22b, each rod being electrically insulated from rods on either side thereof. Alternate rods are connected to separate and different LC circuits, as will be explained hereinbelow. FIG. 1b shows a side view of the present apparatus. Gas enclosure 14 has means, 23a and 23b, for introducing and removing gaseous medium 20 so that the plasma may be generated in a flowing gas, or alternatively, the apparatus may be operated in a sealed mode. Openings (not shown) may be present in enclosure 14 for attaching optical components such as windows, mirrors, partial reflectors and the like, for operating the apparatus as a laser oscillator or amplifier.

Figure 2:
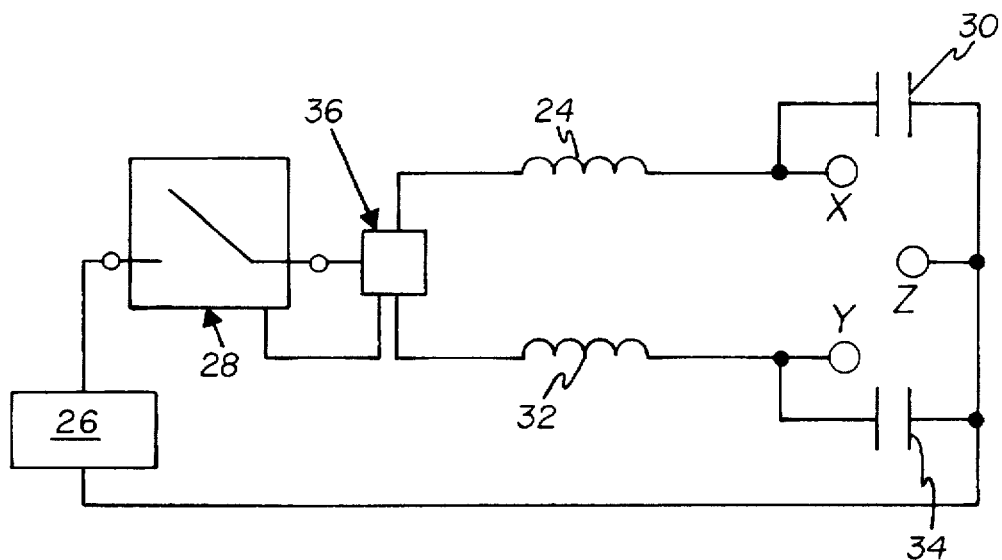
FIG. 2 is a schematic representation of the electrical circuit used to generate the uniform plasma discharge in the apparatus shown in FIGS. 1a and 1b hereof.

FIG. 2 shows one embodiment of a circuit used to provide electrical energy to the electrodes illustrated in FIGS. 1a and 1b. A first inductor, 24, connects high-voltage supply, 26, through switch, 28, to rods 22a in segmented primary electrode 10, while capacitor, 30, connects this first LC circuit to primary electrode 12. Second inductor, 32, connects voltage supply 26 through switch 28 to rods 22b in segmented primary electrode 10, while capacitor, 34, connects this second LC circuit to primary electrode 12. Electrode 12 is also connected to voltage supply 26 to complete the electrical circuit. It should be mentioned that switch 28 may be any solid-state or other design switch which can rapidly turn the discharge on and off, and which can withstand the applied high-voltage. The precise switch characteristics are determined by the desired response time of the LC circuits. The impedances of the first LC circuit and the second LC circuit are chosen such that a transient differential voltage is generated between rods 22a and 22b of primary electrode 10 when switch 28 permits voltage from voltage supply 26 to be applied thereto sufficient to ionize gas 20 in enclosure 14 in the region between the segments of electrode 10. This preionization initiates a uniform electrical discharge between primary electrodes 10 and 12 with the resulting generation and excitation of a substantially uniform plasma, as the bulk of the electrical energy from voltage supply 26 readily passes through inductors 24 and 32, and into the region between the principal electrodes.

To minimize the voltage and current requirements of switch 28 and to prevent electrode damage in the event of arcing, an over-current protection circuit, 36, is employed in series with switch 28. This circuit, to be described more fully hereinbelow, turns switch 28 off at a pre-selected maximum current. A Zener diode (not shown) may be used in parallel with switch 28 in order to limit the voltage across the switch.

Having generally described the present invention, the following Example provides the details of a laser constructed according to the teachings of the present invention.

EXAMPLE

A carbon dioxide laser oscillator has been fabricated using the general characteristics illustrated in FIGS. 1a and 1b hereof, and the implementation of the design principals set forth hereinabove. Eight, 80 cm long, ⅛" diameter rods (22a and 22b) were placed on 3/16" centers to form principal discharge electrode 10. For simplicity, the same electrode structure was used for principal discharge electrode 12 (however, all of the rods were held at the same potential), and the effective discharge cross section was 1⅛"×1⅛". Electrodes 10 and 12 were placed 1⅛" apart. The laser was operated at 25 Torr with a gas mixture of 65% He, 20% $CO_2$ and 15% $N_2$. The required voltage to achieve a uniform, reproducible discharge throughout the effective volume was less than 2 kV. Capacitors 30 and 34 were chosen to have a capacitance of 22 nF, while inductor 24 was chosen to have an inductance of 275 µH and inductor 32 an inductance of 1.1 mH. In this application, the switch employed 28 had microsecond switching characteristics.

Figure 3:
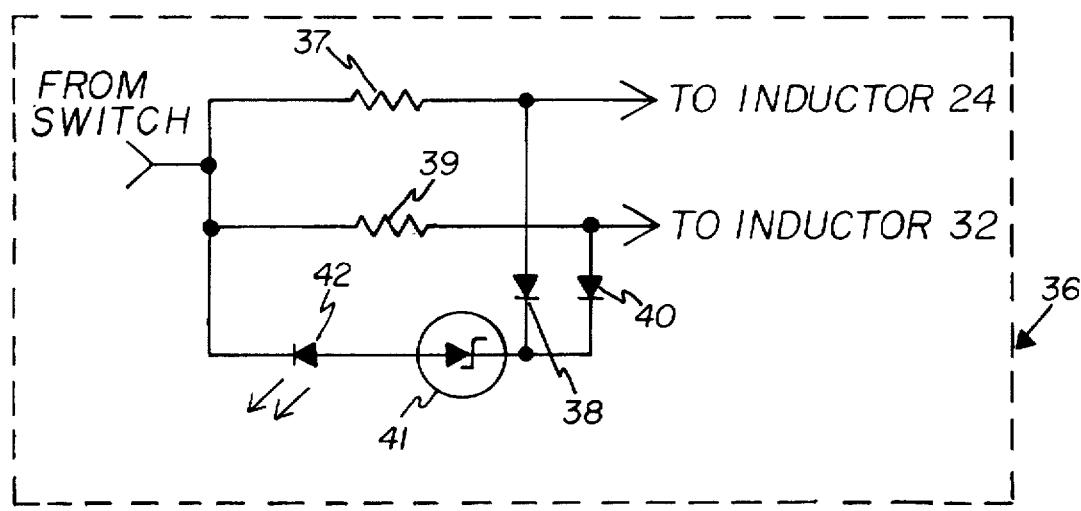
FIG. 3 is a schematic representation of one embodiment of an over-current sensing circuit used to protect the electrodes and high-voltage switch shown in FIGS. 1a and 1b hereof.

When an arc occurs in the discharge between the principal discharge electrodes, the current passing through the switch will increase and the voltage between the discharge electrodes will decrease. To incorporate an arc detection circuit into the apparatus for switching off the high-voltage switch, a detection circuit is required to determine whether an over-current condition exists or whether the potential difference between the discharge electrodes has fallen below an allowable value. Several techniques may be employed for sensing one or both of these conditions. In a preferred circuit, a resistor is inserted in each of the electrical pathways leading to the segments of the segmented electrode. The voltage across each such resistor is interrogated through an isolation diode by means of a Zener diode placed in series with a light-emitting diode which generates an optical pulse in response to a voltage across any of the resistors exceeding the voltage rating of the Zener diode. Protection circuitry is included to prevent damage to the Zener diode and the light-emitting diode. The optical signal from the light-emitting diode is coupled to a receiver using a fiberoptic cable or a single emitter/receiver package, such as an optical isolator, may be employed. The signal from the receiver is directed into a trigger-generating circuit which switches off the high-voltage switch. FIG. 3 illustrates the details of this circuit design, which is incorporated into FIG. 2 hereof as over-current protector 36. Current passing through resistor, 37, generates a voltage through diode, 38, across Zener diode, 41, and light-emitting diode, 42. Similarly, for the current passing through resistor, 39. If the current passing through either of resistors 37 or 39 is sufficiently high to exceed the voltage rating of the Zener diode 41, a current will flow through light-emitting diode 42 causing light to be emitted. The emitted light may then be detected using low-voltage circuitry which can turn off high-voltage switch 28. The diode orientation shown in FIG. 3 is suitable for an electron flow from the switch to inductors 24 and 32.

The foregoing description of the invention has been presented for purposes of illustration and description and is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for uniformly ionizing a gaseous medium and for uniformly depositing energy therein, which comprises in combination:

a. a first, substantially planar electrode;

b. a second, substantially planar electrode, spaced apart from, parallel to, and approximately coextensive with said first electrode, whereby a volume is formed therebetween into which said gaseous medium may circulate, said second electrode being segmented such that first electrically conducting segments are in electrical connection with one another, each pair of first segments being separated by and electrically insulated from electrically conducting second segments, said second segments being in electrical connection with one another;

c. a first impedance network in electrical connection between said first segments of said second electrode and said first electrode, and having a first impedance for high-voltage pulses;

d. a second impedance network in electrical connection between said second segments of said second electrode and said first electrode, and having a second impedance for high-voltage pulses, said second impedance network having a different impedance from said first impedance network, such that a differential voltage is created between said first segments and said second segments when a voltage pulse is applied thereto; and e. means for applying a high-voltage pulse to said first impedance network and to said second impedance network having sufficient amplitude and duration such that the voltage differential generates substantial ionization of said gaseous medium between said first segments and said second segments and such that the substantial ionization thus produced initiates a uniform electrical discharge through the gaseous medium between said first electrode and said second electrode.

2. The apparatus as described in claim 1, further comprising a gas impermeable enclosure for containing said gaseous medium, and for supporting said first electrode and said second electrode.

3. The apparatus as described in claim 2, further comprising means for permitting introduction and removal of said gaseous medium from said gas impermeable enclosure.

4. The apparatus as described in claim 1, wherein said first impedance network and said second impedance network include an inductor and a capacitor.

5. The apparatus as described in claim 1, wherein said first electrically conducting segments and said second electrically conducting segments comprise spaced-apart and substantially parallel electrically conducting rods.

6. The apparatus as described in claim 1, wherein said means for applying a high-voltage pulse to said first impedance network and to said second impedance network comprises a high-voltage source and a high-voltage switch.

7. The apparatus as described in claim 6, further comprising an over-current protection circuit which includes a first resistor placed in series with said first impedance network, a second resistor placed in series with said second impedance network, means for interrogating the voltage across each of said first resistor and said second resistor, said interrogating means comprising a Zener diode, having a chosen breakdown voltage, placed in series with a light-emitting diode, a first isolation diode and a second isolation diode for isolating said interrogating means from said first impedance network and said second impedance network, respectively, whereby said light-emitting diode generates an optical pulse in response to a voltage across either of said first resistor or said second resistor which exceeds the breakdown voltage of said Zener diode, means for detecting the optical signal from said light-emitting diode, and means for switching off said high-voltage switch.

8. A method for uniformly ionizing a gaseous medium and for uniformly depositing energy therein, which comprises the steps of:

a. introducing the gaseous medium into a volume formed by a first, substantially planar electrode and a second, substantially planar electrode spaced apart from, parallel to, and approximately coextensive with the first electrode, the second electrode being segmented such that first electrically conducting segments are in electrical connection with one another, each pair of first segments being separated by and electrically insulated from electrically conducting second segments, the second segments being in electrical connection with one another, and the first segments and second segments having different impedances for high-voltage pulses; and b. applying a high-voltage pulse between the first conducting segments of the second electrode and the first electrode, and between the second conducting segments of the second electrode and the first electrode having sufficient amplitude and duration whereby a voltage differential between the first conducting segments and the second conducting segments is established such that substantial ionization of the gaseous medium between the first segments and the second segments is generated and such that the substantial ionization thereby produced initiates a uniform electrical discharge through the gaseous medium between the first electrode and the second electrode.

* * * * *